June 6, 1967    T. J. LORD    3,323,546

HYDRAULIC BLEED VALVE

Filed July 1, 1964

INVENTOR.
THOMAS J. LORD
BY JE Beringer
His ATTORNEY

United States Patent Office  3,323,546
Patented June 6, 1967

3,323,546
HYDRAULIC BLEED VALVE
Thomas J. Lord, Middletown, Ohio, assignor to the United
Aircraft Products, Inc., Dayton, Ohio, a corporation
of Ohio
Filed July 1, 1964, Ser. No. 379,477
3 Claims. (Cl. 137—615)

This invention relates to valves used in vehicles or other locations providing a vibratory environment, and particularly to hydraulic bleed valves and the like.

An object of the invention is to provide a hydraulic bleed valve or the like with means to inhibit accidental disassembly of the parts of the valve, characterized by simplicity of construction and adaptability of use.

Figure 1:
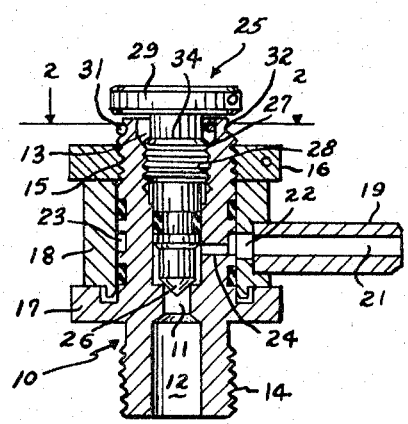
Figure 2:
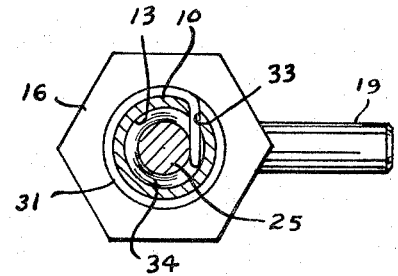

Other objects and structural details of the invention will appear from the following description, when read in connection with the accompanying drawings, wherein:

FIG. 1 is a view in longitudinal section of a hydraulic bleed valve in accordance with the illustrated embodiment of the invention; and FIG. 2 is a view in cross-section, taken substantially along the line 2—2 of FIG. 1.

Referring to the drawings, in its illustrated embodiment a valve according to the invention comprises a generally cylindrical body member 10 having a through longitudinal bore 11. Opening through opposite ends of the bore 11 are respective counterbores 12 and 13. In the region of counterbore 12 the body 10 is formed with the exterior screw threads 14 by means of which the body may be installed in a vessel or line holding or flowing fluid under pressure. In the region of counterbore 13 the body has external screw threads 15 rotatably engaged by a correspondingly threaded nut 16. In opposed, spaced relation to the nut 16 is a flange 17 formed integrally with the body 10. Intermediate the nut 16 and flange 17 is a cylindrical swivel member 18. A short length tube 19 is installed endwise in the swivel member 18 to project radially therefrom and have a through longitudinal opening 21. The latter communicates through a lateral opening 22 in swivel member 18 with an annular groove 23 in the exterior of body 10. A lateral opening 24 in the body 10 connects groove 23 to counterbore 13 near the bottom thereof.

A valve stem 25 is received in the body 10 through counterbore 13. A conical inner end 26 thereof is adapted to seat in the bottom of the counterbore in a closing relation to bore 11. So seated the valve prevents communication through the bore 11 between counterbore 12 and opening 24. Toward its other or outer end the valve stem is formed with external screw threads 27 engaging screw threads 28 on the interior of body 10 in counterbore 13. The said other or outer end of the valve stem projects through and beyond body 10 and is formed with a knurled head 29.

A lock ring 31 encircles the exterior of body 10 in the region of the exterior screw threads 15. A groove 32 in the body accommodates the ring 31 and holds it against displacement longitudinally of the body. One end of the ring 31 is bent to project through a tangential opening 33 in the body 10 in the plane of groove 32. The inwardly projecting end of the lock ring 21 is thus disposed within counterbore 13 to lie between the outer periphery of valve stem 25 and the inner periphery of body 10, the location being adjacent the screw threads 32 of the valve stem.

In the operation of the device, counterbore 12 communicates with a source of pressure fluid, access of which to the lower part of counterbore 13 and to lateral passage 11 is alternatively permitted and denied by appropriate adjustment of the valve stem 25. Thus, rotation of the valve stem, through finger manipulation of the head 29, serves through the interengagement of screw threads 28 and 27 to advance or retract the valve stem within the body 10 seating or unseating the conical end portion 26 with respect to the bottom of the counterbore. In a seated position, as illustrated, bore 11 is closed and no access is permitted from counterbore 12 to the lateral passage 24. By suitable rotation of the valve stem, however, a retracting or backing off of the stem is accomplished, lifting the conical valve end 26 from its position closing bore 11. Communication between counterbore 12 and lateral passage 24 is thus established.

The laterally projecting tube 19 is adapted for connection of the valve to a flexible fluid pressure conducting hose line or the like, and, it will be understood that member 18 is made rotatable in order that the tube 19 may assume varying positions of angular adjustment as may be convenient or desirable. The member 18 rotates while seated on flange 17. It is held in selected positions of adjustment by frictional pressure applied by a nut 16. Thus, the nut 16 is engageable with one end of the member 18 while the other end thereof seats on flange 17. Rotary turning motion of the nut in an advancing direction toward flange 17 thus results in a squeezing pressure applied to the swivel member 18 effectively locking it to the flange against rotary motion. A reverse direction of rotation of the nut retracts it relatively to the swivel member, releasing the member for rotary adjustment.

The aforementioned groove 32, seating lock ring 31, is in effect a continuing part of the body exterior screw threads 15. Accordingly, motion of the nut 16 in an axial retracting direction is limited by engagement with the ring 31. The inwardly projecting end of the ring 31 lies in adjacent overlying relation to a shoulder 34 representing one end of the screw threads 27. A retracting motion of the valve stem 25 thus is limited by engagement of the shoulder 34 with the ring 31. The ring 31 accordingly serves a function, common to the nut 16 and to the valve stem 25, of limiting relative retracting motion of these elements, as might be caused by vibration. Accidental disassembly of the valve in a vibratory environment thus is prevented.

What is claimed is:

1. A hydraulic bleed valve for use in a vibratory environment, comprising a body having a through bore therein, a counterbore and an integrally formed radial flange, a portion of the exterior of said body and a portion of the interior thereof in said counterbore being threaded; a valve stem received in said counterbore in threaded engagement with the threaded portion therein; said valve stem being rotatable for adjustment to and from a seat in the bottom of said counterbore closing and opening said bore, said body having a lateral opening communicating with said bore in the unseated position of said valve; a swivel member in surrounding relation to said body relatively rotatable thereon and seated on said flange, said swivel member having means to communicate with said lateral opening in said body in different positions of rotary adjustment; a nut in threaded engagement with said body on the said threaded portion of the exterior thereof and adapted to be rotated in one direction to lock said swivel body to said flange and rotated in the opposite direction to release said swivel member for rotary adjustment; and a single means limiting axial adjusting motion of said valve stem and of said nut relative to said body in a common direction, said single means comprising a lock ring in encircling relation to the threaded portion of the exterior of said body and having an end projecting through the body into said counterbore, said valve stem having a shoulder to engage said projected end of said ring.

2. A hydraulic bleed valve for use in a vibratory environment, said body having exterior and interior threaded portions and a radial flange; a swivel member rotatably mounted on said body and seated on said flange, said swivel member and said body having cooperating fluid flow passages; a nut rotatable on the exterior threaded portion of said body to effect axial advancing end retracting motion toward said flange, said swivel member being mounted between said nut and said flange and alternatively locked to and released from said flange by adjustment of said nut; a valve stem received in said body in threaded engagement with the interior threaded portion of said body, said valve stem being rotatable in said body to effect relative advancing and retracting motions therein controlling fluid flow through said cooperating passageways; and a single means common to said nut and said valve stem limiting relative retracting motion of both thereof, said single means comprising a lock ring in encircling relation to the threaded exterior of said body and having a portion projecting into said body, said valve stem having a shoulder to engage said projecting portion of said ring.

3. A hydraulic bleed valve for use in a vibratory environment, comprising a body having a through bore therein, a counterbore and integrally formed radial flange, exterior and interior portions of said body being threaded, the latter being in said counterbore, said body further having a lateral opening communicating with said counterbore and still further having an annular exterior groove into which said lateral passage opens; a swivel member rotatably mounted on the exterior of said body and seated on the flange, said swivel member having a flow passage registering with said annular groove; a nut rotatably mounted on the threaded exterior of said body and adapted to advance thereby toward said flange to lock said swivel member to a rotary position of adjustment relative to said flange and body, said nut having a retracting motion in an opposite sense; a lock ring installed on the exterior of said body to limit retracting motion of said nut, a valve stem received in said counterbore and rotatably engaged with the threaded interior thereof to axially advance upon and be retracted from the bottom of said counterbore alternatively to close and to open communication between said bore and said lateral opening in said body through said counterbore, said body having another lateral opening therein and a portion of said lock ring projecting through said other lateral opening into said counterbore and cooperating with a portion of said valve stem to limit relative retracting motion thereof.

References Cited
UNITED STATES PATENTS

| | | | |
|---|---|---|---|
| 1,246,389 | 11/1917 | Buelna | 137—615 X |
| 1,678,377 | 7/1928 | Brotz | 137—615 X |
| 2,459,643 | 1/1949 | Hartley | 285—91 X |
| 2,678,846 | 5/1954 | Rogers | 251—284 X |
| 3,078,677 | 3/1963 | Cripe | 285—91 X |

WILLIAM F. O'DEA, *Primary Examiner.*

ALAN COHAN, D. R. DONOVAN,
*Assistant Examiners.*